(12) United States Patent
Govorkov et al.

(10) Patent No.: US 7,184,216 B2
(45) Date of Patent: Feb. 27, 2007

(54) OPTICAL PULSE DURATION EXTENDER

(75) Inventors: Sergei V. Govorkov, Boca Raton, FL (US); Luis A. Spinelli, Sunnyvale, CA (US); William Eugene White, Santa Clara, CA (US); Murray Keith Reed, Menlo Park, CA (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 11/395,737

(22) Filed: Mar. 31, 2006

(65) Prior Publication Data
US 2006/0171036 A1 Aug. 3, 2006

Related U.S. Application Data

(63) Continuation of application No. 10/790,660, filed on Mar. 1, 2004, now Pat. No. 7,035,012.

(51) Int. Cl.
*G02B 27/10* (2006.01)
*H01S 3/10* (2006.01)
*H01S 3/22* (2006.01)
*G03B 27/52* (2006.01)

(52) U.S. Cl. ............. 359/618; 359/619; 359/629; 372/25; 372/55; 372/57; 372/108; 355/53; 355/67

(58) Field of Classification Search .......... 359/618, 359/619, 629, 639, 455, 599; 372/20, 25, 372/55, 57, 97, 99, 100, 108, 61; 355/53, 355/67, 69, 71, 77
See application file for complete search history.

(56) References Cited

U.S. PATENT DOCUMENTS 3,879,109 A 4/1975 Thomas .......... 350/160 R
5,309,456 A 5/1994 Horton .......... 372/25
5,361,275 A 11/1994 Opower .......... 327/108

(Continued)

FOREIGN PATENT DOCUMENTS

JP 3637200 1/2005

(Continued)

OTHER PUBLICATIONS

D Herriott et al., "Off-Axis Paths in Spherical Mirror Interferometers," *Applied Optics*, vol. 3, No. 4, Apr. 1964, pp. 523-526.

(Continued)

*Primary Examiner*—Loha Ben
(74) *Attorney, Agent, or Firm*—Stallman & Pollock LLP

(57) ABSTRACT

An optical pulse extender includes a delay loop formed by a plurality of mirrors and a graded reflectivity beamsplitter. The mirrors and the beamsplitter are configured and aligned such that a pulse to be broadened makes a predetermined number of round trips in the delay loop and is incident on a different zone of the beamsplitter after each round trip. The different zones of the beamsplitter have different reflection values and different transmission values. These values are selected such that the pulse extender delivers a plurality of temporally and spatially separated replica pulses each thereof having about the same energy. The delivered replica pulses together provide an extended pulse having a longer duration than the input pulse. The replica pulses may be passed through a beam homogenizer to spatially homogenize the temporal characteristics of the extended pulse.

14 Claims, 7 Drawing Sheets

U.S. PATENT DOCUMENTS

| | | |
|---|---|---|
| 5,661,748 A | 8/1997 | Zahavi et al. .................. 372/108 |
| 5,789,876 A | 8/1998 | Umstadter et al. ............ 315/507 |
| 6,078,606 A | 6/2000 | Naiman et al. .................. 372/97 |
| 6,191,887 B1 | 2/2001 | Michaloski et al. .......... 359/495 |
| 6,389,045 B1 | 5/2002 | Mann et al. ...................... 372/25 |
| 6,535,531 B1 * | 3/2003 | Smith et al. ...................... 372/25 |
| 6,549,267 B1 | 4/2003 | Kudo .................................. 355/53 |
| 6,693,930 B1 | 2/2004 | Chuang et al. ............ 372/29.021 |
| 6,904,073 B2 * | 6/2005 | Yager et al. ...................... 372/57 |
| 6,928,093 B2 * | 8/2005 | Webb et al. ...................... 372/25 |
| 7,016,388 B2 * | 3/2006 | Klene et al. ...................... 372/55 |
| 2002/0044586 A1 | 4/2002 | Myers et al. ...................... 372/57 |
| 2003/0099269 A1 | 5/2003 | Ershov et al. .................... 372/55 |
| 2003/0117601 A1 | 6/2003 | Kudo .................................. 355/53 |
| 2004/0136417 A1 | 7/2004 | Webb et al. ...................... 372/25 |
| 2004/0202220 A1 | 10/2004 | Hua et al. .......................... 372/57 |
| 2005/0002425 A1 | 1/2005 | Govorkov et al. ............... 372/25 |

OTHER PUBLICATIONS

M. Lai et al., "Transversely pumped 11-pass amplifier for femtosecond optical pulses," *Applied Optics*, vol. 30, No. 30, Oct. 20, 1991, pp. 4365-4367.

* cited by examiner

OPTICAL PULSE DURATION EXTENDER

PRIORITY

This application is a continuation of U.S. patent application Ser. No. 10/790,660, filed Mar. 1, 2004, entitled "OPTICAL PULSE DURATION EXTENDER," now U.S. Pat. No. 7,035,012, which is hereby incorporated herein by reference.

TECHNICAL FIELD OF THE INVENTION

The present invention relates generally to optical lithography apparatus employing pulsed ultraviolet (UV) radiation. The invention relates in particular to a pulse duration extender (pulse extender) for use with such apparatus.

DISCUSSION OF BACKGROUND ART

In optical lithography apparatus employing pulsed ultraviolet (UV) radiation, optical projection elements of the apparatus, commonly made from fused silica, usually progressively degrade as a result of interaction with the UV radiation being projected. The degradation is a result of multiphoton effects. Accordingly, the operating cost of the apparatus is strongly dependent, among other factors, on the rate at which this degradation progresses. The degradation rate of the optical elements depends, among other factors, on the peak intensity of ultraviolet radiation pulses incident thereon. Ultraviolet radiation pulses are typically delivered to the projection apparatus by a laser such as an excimer laser. One means for reducing the peak intensity of a radiation pulse delivered by the laser is to extend the duration of the optical pulse, i.e., to make the pulse longer. This is accomplished by an optical device known as a pulse extender or a pulse stretcher.

Commonly used prior-art pulse extenders utilize a partially reflective mirror (beamsplitter) to split the energy of a radiation pulse into two portions. One portion is transmitted through the beamsplitter as a first replica pulse, the other portion is delayed in an optical delay line. One portion of the delayed portion of the pulse (a second replica pulse) is spatially overlapped with the originally transmitted first replica of the pulse. Another portion of the delayed replica pulse is further delayed and portion of that portion (third replica) is temporally overlapped, and so on. Overlapped pulse replicas form the desired longer pulse. The longer pulse has the energy of the original pulse less any energy losses involved in splitting the original pulse and replicas thereof.

One example of prior-art pulse extender 20 is schematically illustrated in FIG. 1. Pulse extender 20 includes a beamsplitter 22 having a partially reflective and partially transmissive surface 24, and a delay loop 26 formed by concave spherical mirrors 28, 30, 32, and 34. The spherical mirrors relay an image of an incoming pulse (not shown) at the beamsplitter back onto the beamsplitter. A portion of a pulse incident on surface 24 of the beamsplitter is transmitted by the beamsplitter as indicated in FIG. 1 by a single arrowhead. The transmitted portion can be considered as the first replica pulse. Another part of the incident pulse reflected from surface 24, then sequentially from mirrors 28, 30, 32, and 34 as indicated in FIG. 1 by double arrowheads. Reflective surface of beamsplitter 24 reflects a portion of this delayed portion of the pulse (a second replica pulse) along the same path as the first-transmitted portion but delayed by a time τ, which is the round trip time in delay loop 26. Reflective surface of beamsplitter 24 transmits a portion of this replica pulse that undergoes further delays and division into reflected and transmitted portions. A subsequently delayed portion has lesser energy than a previously delayed portion. In theory at least, the number of round trips and replica pulses is infinite. In practice, however, the energy of replica pulses becomes vanishingly and uselessly small after as few as three replica pulses have been produced. An explanation of this operation is set forth below.

FIG. 2 schematically illustrates a generalized pulse extender 40 of the type illustrated in FIG. 1. A beamsplitter is represented by a single partially reflective partially transmissive surface 42, and a delay loop is represented by a rectangular path 44. Those skilled in the art will recognize that the delay loop 40 could include four mirrors arranged as illustrated in FIG. 1 or any other arrangement of the same or a different number of mirrors to accomplish a similar result.

The pulse extender in FIG. 2 can be analyzed, in one example, by considering a rectangular input pulse 46 of duration $t_p$ of about 20.0 nanosecond (ns) with beamsplitter 42 having a reflectivity $R_{BS}$ of about 64%. Optical losses L in loop 44, per round trip in the loop are assumed to be about 20%, optical delay τ in the delay loop is assumed to be equal to about 20.0 ns. In response to the single incident pulse 46, the output of extender 40 will include a sequence of pulses beginning with an originally transmitted (first) replica of the incident pulse 48 and increasingly delayed second and third replica pulses 50 and 52 respectively. Replica pulses 48, 50 and 52 would have an energy ratio 0.36:0.33:0.09. There would be subsequently delivered replica pulses albeit vanishingly small as noted above. The Time-Integral Square (TIS) pulse length is about 49.0 ns, providing a pulse-duration extension-ratio of 2.5. The TIS pulse length is the duration of a hypothetical rectangular pulse of equal energy that produces the same multiphoton effect as the pulse sequence. Total output energy in the pulse sequence is about 75% of the energy of input pulse 46. In a hypothetical case of zero losses in the delay loop, a maximum extension ratio of about 3.0 could be achieved.

It should be noted here that pulse replicas 48, 50, and 52 are depicted in FIG. 2 as having a rectangular temporal shape for convenience of illustration at the scale of the drawing. Those skilled in the art will be aware that in practice, such replicas would have a temporal shape closer to a Gaussian shape. FIG. 3 schematically depicts pulse replicas 48, 50, and 52 (dotted curves), represented as Gaussian-shaped pulses having a temporal width of about 20 ns measured at 50% of peak intensity. The pulses are temporally spaced or delayed, one from the next, by the temporal pulse width (τ) of 20 ns and have the energy ratio 0.36:0.33:0.09 exemplified above. The calculated sum of the replica pulses (the extended pulse) is depicted in FIG. 3 by solid curve 53. Noting, here, that the width of extended pulse 53 is also defined at the 50% peak intensity, it can be seen that the most delayed pulse replica 52 contributes little to extending the width of extended pulse 53.

Clearly, further pulse-width extension could be achieved by using two or more pulse width extenders 40 in series. This further extension, however, would be achieved at the expense of further loss of pulse energy and an increase in source power required to accommodate the extenders. Optical losses are due primarily to losses on each reflection from a mirror. By way of example, for commercially available mirrors, at ultraviolet wavelengths about 193 nanometers (nm) losses of about 4% can be expected at each mirror due to transmission, absorption, and scattering of incident radiation. For longer wavelengths smaller losses can be anticipated.

It is evident from the above-discussed analysis of a prior-art pulse extender that there is a limit to the achievable pulse extension by any one extender due to the energy of an extended pulse being concentrated in the first two replicas of the input pulse. There is a need for a pulse extender that provides a series of replica pulses of approximately equal magnitude.

SUMMARY OF THE INVENTION

The present invention is directed to a method and apparatus for extending the duration of an optical pulse. In one aspect of the invention the pulse duration extension method comprises dividing the optical pulse into a sequence of at least three replica pulses each having about the same energy. The replica pulses are formed into a temporally paced sequence thereof, and optically summed to provide an extended optical pulse having a duration longer than the duration of the optical pulse.

Preferably consecutive ones of said replica pulses in the sequence are temporally spaced by about the duration of the optical pulse. This provides that the extended pulse has a duration about equal to the duration of the optical pulse times the number of replica pulses in the sequence.

In another aspect of the invention the apparatus comprises a delay loop formed by two or more mirrors and a plurality beamsplitters and is configured to receive the optical pulse. The mirrors and the beamsplitters are configured and aligned such that portions of the optical pulse make a predetermined number of round trips in the delay loop, with different portions of the optical pulse being incident on different ones of the beamsplitters. The reflectivities of the beamsplitters are selected such that the pulse extender delivers, via the beamsplitters, a plurality of temporally and spatially separated replicas of the optical pulse each thereof having about the same energy.

In providing that all of the replica pulses have the same energy, a greater pulse extension is provided than with prior-art extenders for the same number of replicas, and a greater number of useful replicas can be generated. The number of replicas is predetermined and is selected according to the desired extension. Preferably at least three equal-energy replica pulses are generated. The number of replicas that can be generated by only one of the inventive pulse extenders is limited only by the total optical loss that can be tolerated. In one example of the present invention wherein an input pulse has a wavelength of 193 nm, a series of four pulse replicas is generated, providing a pulse extension ratio of 4.0, and having a total pulse energy equal to about 75.5% of the energy of the input pulse.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

DETAILED DESCRIPTION OF THE INVENTION

Figure 4:
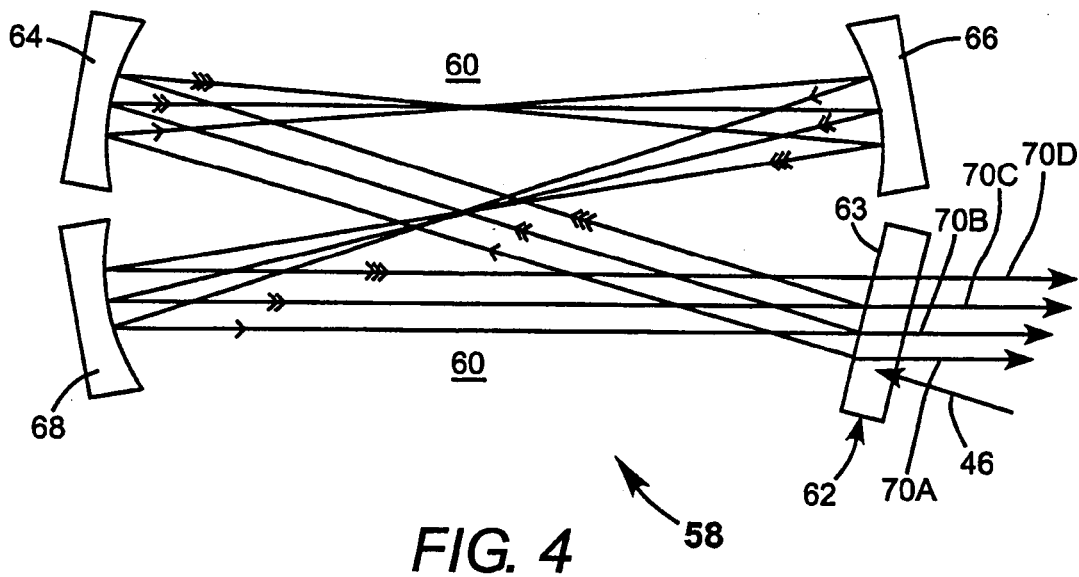
FIG. 4 is a plan view schematically illustrating one preferred embodiment of a pulse extender in accordance with the present invention, including an optical delay loop formed by a plane, graded reflectivity beamsplitter and three concave spherical mirrors.

Referring now to the drawings, wherein like features are designated by like reference numerals, FIG. 4 schematically illustrates one preferred embodiment 58 of a pulse extender in accordance with the present invention. Extender 58 includes a delay loop 60 formed by a graded reflectivity beam splitter 62 and spherical mirrors 64, 66, and 68. Mirrors 64 and 68 are spherical concave mirrors having a focal length $f_1$. Mirror 66 is a spherical concave mirror having a focal length $f_2$. Graded reflectivity beamsplitter 62 has a flat reflecting surface 63 graded, tiled or partitioned into areas or zones each thereof having a different reflectivity. Those skilled in the art will recognize that in the description presented hereinbelow that when a percentage reflectivity is specified for a zone, that zone will have a transmissivity equal to 100% minus the specified reflectivity and optical losses due to scatter, absorption and the like.

Figure 3:
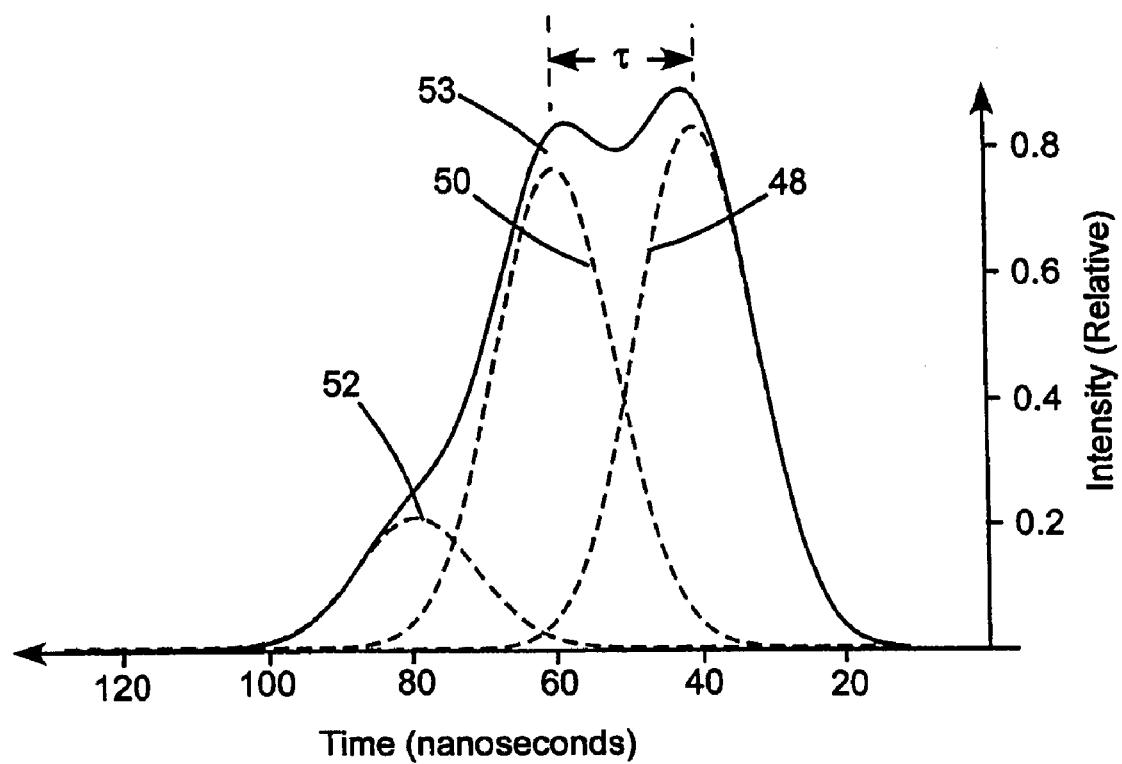
FIG. 3 is a graph schematically illustrating calculated summing of pulse replicas having a Gaussian temporal shape in the pulse extender arrangement of FIG. 2.

Continuing with reference to FIG. 4, input pulse (beam) 46 is partially reflected by beamsplitter 62 to provide a first pulse replica 70A. A transmitted portion of the input beam makes a first round trip through loop along a path 70, being sequentially reflected by mirrors 64, 66, and 68, as indicated by single arrowheads in FIG. 3. After this first round trip, the beam is partially reflected and partially transmitted by beamsplitter 62. The transmitted portion provides a second pulse replica 70B. The reflected portion makes a second round trip, indicated by double arrowheads, then is again partially reflected and partially transmitted by beamsplitter 62. The transmitted portion provides a third pulse replica 70C. The reflected portion makes a third round trip, indicated by triple arrowheads, then is finally transmitted by beamsplitter 62 to provide a fourth pulse replica 70D. The four pulse replicas are temporally spaced, one with respect to the next, by the round trip time in delay loop 60. If this round trip time is made equal or less than the duration of the input pulse 46 the pulse replicas may be combined to provide, in effect, an extended pulse. The pulse extension factor will be the greatest, for any given number of pulse replicas when the round trip time in delay loop 60 is about equal to duration of the input pulse, in which case the pulse replicas may be defined as being temporally contiguous or temporally continuous, i.e., the trailing edge of one pulse is contemporary with the leading edge of a subsequent pulse.

Mirrors 64 and 66, and mirror 68 and graded reflectivity beamsplitter 62 are preferably separated by a distance approximately equal to $f_1+2 f_2$. This ensures that a source in the plane of surface 63 of graded reflectivity beamsplitter 62 is relay imaged onto the same plane (albeit with a lateral displacement discussed in further detail below) after a complete roundtrip in delay loop 60. Relay imaging is at unit magnification (1:1) when mirrors 64 and 68 have the same focal length. Preferably $f_1$ is about equal to $2f_2$. This provides that the size of circulating beam 70 is the same on all three mirrors and beamsplitter 62, and focal points of the beam are located mid-way between mirrors 64 and 66, and between mirrors 66 and 68. When the beam size is the same on all four mirrors, there is no concentration of energy on any particular mirror that would cause that particular mirror to degrade before any other.

The mirrors are aligned in such a way that each time circulating beam 70 arrives at a location on surface 63 of the graded reflectivity beamsplitter the beam is displaced from the location of a previous arrival by a distance about equal to the width of the beam. Because of this arrangement, the output of the pulse extender comprises a series of beams 70A–D grouped or "stitched" side-by-side or essentially spatially contiguous. Effects of less than perfect stitching at beam boundaries are minimized or "washed out" by diffraction as beams 70A–D propagate.

Figure 5:
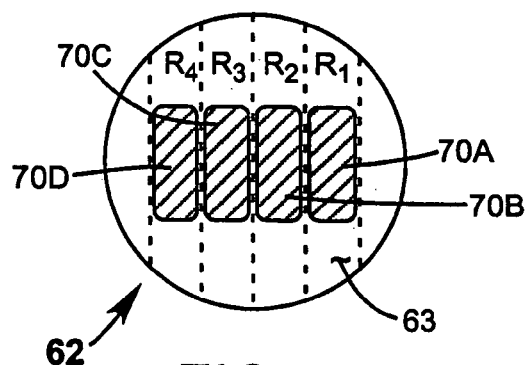
FIG. 5 schematically illustrates one preferred arrangement of the graded reflectivity beamsplitter of FIG. 4 including four surface zones each having a different reflectivity.

FIG. 5 schematically illustrates details of one example of an arrangement of surface 63, viewed from the front, i.e., from inside delay loop 60, of graded reflectivity beamsplitter 62. Here, an arrangement suitable for three passes (round trips) in the delay loop 60 is depicted. At least three round trips is preferred. Three passes in delay loop 60 will provide four replica pulses 70A–D in an output beam as described above. Three passes are selected here for convenience of illustration. Those skilled in the art will recognize, without further illustration how beam 70 would propagate for four or more round trips providing, correspondingly, five or more pulse replicas. The greater the number of replicas, the greater the possible pulse extension. In a delay loop such as delay loop 60, the number of passes (and corresponding number of replica pulses) possible is limited only by the amount of loss of pulse energy that can be tolerated.

Surface 63 is divided into four parallel, partially reflective, partially transmissive parallel zones or strips (defined in FIG. 5 by dashed lines), which, for convenience, are designated by symbolic reflectivity values $R_1$, $R_2$, $R_3$, and $R_4$ thereof. Each of the zones can be functionally considered as a separate beamsplitter. The opposite surface of beamsplitter 62 is preferably provided with an antireflection coating (not shown). Replica pulse 70A is reflected from zone R1, replica pulses 70B, 70C and 70D are transmitted through zones $R_2$, $R_3$, and $R_4$, respectively.

The width of the reflectivity zones $R_1$, $R_2$, $R_3$, and $R_4$ is selected such that beam 70 is incident in adjacent ones thereof, in sequence, in a corresponding sequence of passes 70A through 70D, designated in FIG. 5 by hatched rounded rectangles correspondingly numbered. By way of example, for mirrors 64 and 68 having a focal length of about 1.5 meters (m), and a mirror spacing of about 3.0 m, beamsplitter 62 preferably has a diameter of about 50 millimeters (mm). Beams 70A–D would each have a height of about 14.0 mm. The width of each of the beams, and correspondingly the width of each of the reflectivity zones, would between about 4.0 mm and 6.0 mm.

Regarding reflectivities of the zones, $R_4$ is preferably zero, as all that remains of the circulating beam is preferably transmitted at this point, thereby effectively preventing any further round trips. One preferred set of values for $R_1$, $R_2$, and $R_3$, for this particular embodiment, assuming optical losses of 20% per round trip, is 17.5%, 74.0%, and 56.0%, and respectively. These values, however, should not be considered as limiting the present invention, nor should they be considered as being optimal in any other embodiments of the present invention described hereinbelow.

Given these reflectivities, in this embodiment, the extension factor of extended pulse provided by pulse replicas 70A–D would be about 4.0 and the total energy of the replicas would be about 75.5% of the input pulse energy. This represents an increase in extension factor increase of about 60% over a prior art stretcher for the same energy efficiency.

A principle advantage of this inventive graded beamsplitter is that reflectivity values for each of the zones can be selected for the corresponding pass such that the intensities of replica pulses transmitted by the reflective zones are about equal to each other. This provides that, resulting TIS pulse duration (pulse width extension) is maximized for a given number of round-trips or passes through delay loop 60. This, in turn, provides for greater efficiency and more compact design than prior-art pulse extenders. Further, as each of the replica pulses can be made to have equal energy, the amount of passes that can be made in delay loop 60 and the corresponding pulse extension that can be achieved are limited primarily by the amount of energy loss, from an initial pulse to an extended pulse, that can be tolerated.

Regarding fabrication of graded reflectivity beamsplitter 62, this can be achieved by depositing a separate multilayer optical coating for each zone using lithographic or mechanical masking. It is also possible to assemble the beamsplitter by optically contacting, side-by-side, or otherwise assembling pre-coated strips, each having the width of a reflective zone. Those skilled in the optical fabrication art may devise other methods of fabricating graded reflectivity beamsplitter 62 without departing from the spirit and scope of the present invention.

It is preferable that the length of delay produced by delay loop 60 is about equal to the duration of the input pulse. If the delay is too short, replica pulses will have greater temporal overlap. This would provide a shorter output pulse for a given number of roundtrips in the delay loop than would be the case were the delay of an optimum duration. Extending the delay beyond an optimum value delay does not lead to increase of TIS and would require that loop 60 occupy more space to provide the longer delay.

Figure 6:
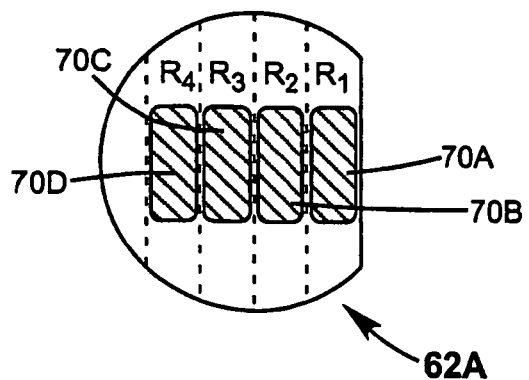
FIG. 6 schematically illustrates another preferred arrangement of the graded reflectivity beamsplitter of FIG. 4, similar to the arrangement of FIG. 5 but configured to allow an input beam to bypass the beamsplitter.

FIG. 6 schematically illustrates an alternative arrangement 62A of a graded reflectivity beamsplitter that allows incoming beam (pulse) 46 to pass the edge of the beamsplitter. This requires that the beamsplitter be D-shaped depicted in FIG. 6. This arrangement, however, requires one more pass or round-trip in delay loop 60 for the same number of replicas as the arrangement of FIG. 5. Four round trips and four reflectivity zones would provide four replica pulses, with each replica pulse being transmitted through a corresponding reflectivity zone.

Figure 7:
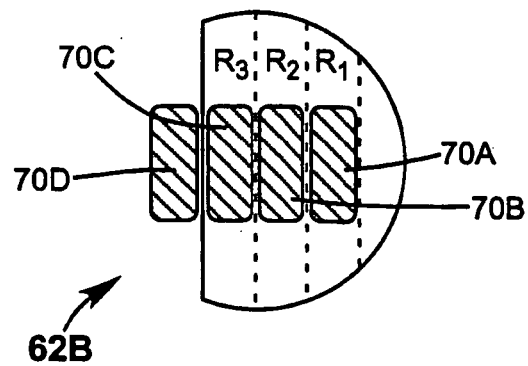
FIG. 7 schematically illustrates yet another preferred arrangement of the graded reflectivity beamsplitter of FIG. 4, similar to the arrangement of FIG. 5 but including only three reflectivity zones and configured to allow an output beam to bypass the beamsplitter.

A better alternative arrangement 62B of a graded reflectivity beamsplitter 62 is depicted in FIG. 7. Here the last output beam 70D bypasses the beamsplitter. This is possible since the reflectivity of the beamsplitter for the last round trip, as noted above, is preferably zero in any case. In this arrangement replica pulse 70A would be reflected from zone $R_1$. Replica pulses 70B and 70C would be transmitted through zones $R_2$, and $R_3$, respectively. This arrangement reduces overall optical losses, but has a potential drawback that some clipping of the beam may occur on the edge of the beamsplitter.

In pulse extender 58 of FIG. 4, and all other embodiments of the inventive pulse-extender described hereinbelow, the pulse-extender provides an output comprising a plurality or sequence of replica pulses 70A–D, each one having the pulse length of the input pulse, but spaced temporally spaced apart in the sequence by the round trip time through the delay loop of the pulse extender. The replica pulse beams are spatially grouped together in the width direction with adjacent ones thereof essentially optically contiguous. The terminology "essentially contiguous", here, means that the beam boundaries and junctions therebetween are blurred or washed out by diffraction effects as discussed above.

In many applications, this form of output will be less than ideal, at least because different portions of the beam would arrive at different portions of a target area at a different time. Accordingly a point on the target may see a pulse having the same duration as the original pulse but with reduced energy. Preferably, the temporal characteristics of the plurality of replica pulses are spatially homogenized after being delivered from the inventive pulse extender. A description of this operation is set forth below with reference to FIG. 8.

Figure 8:
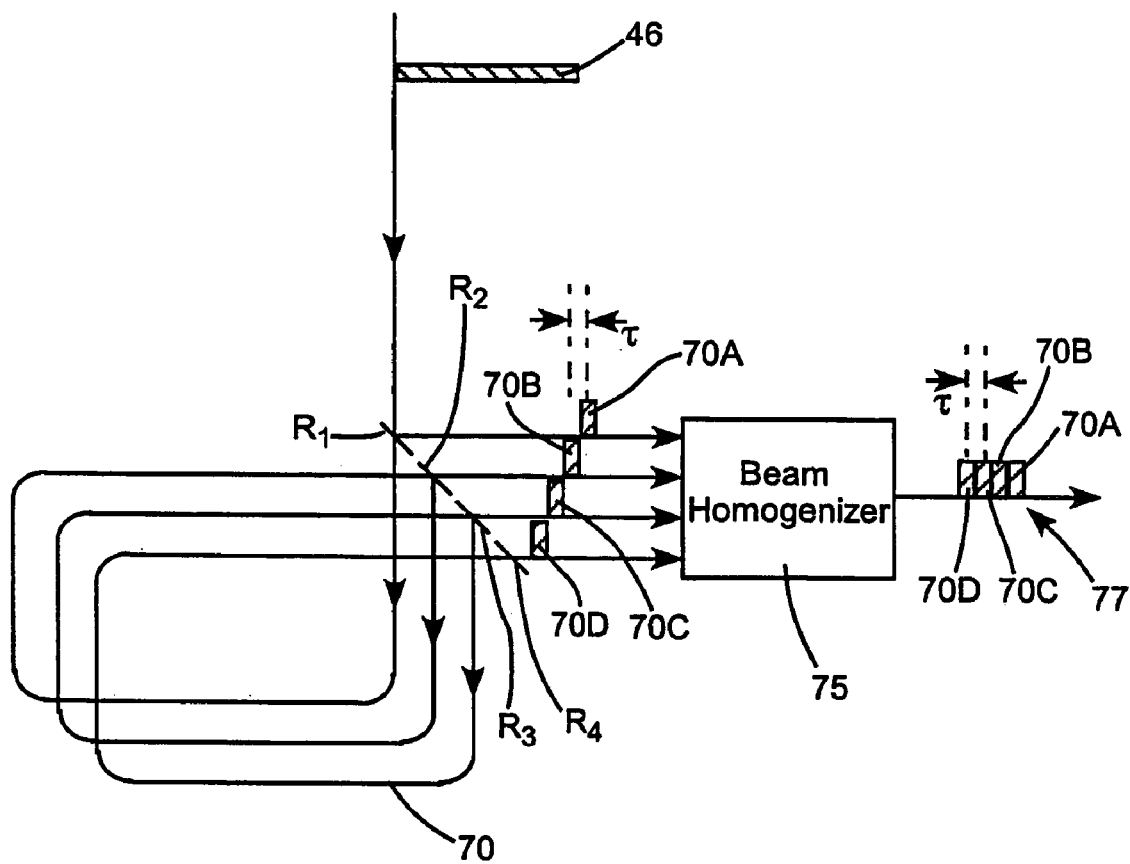
FIG. 8 is a simplified illustration of the pulse-extender of FIG. 4 providing four equal-energy replicas of an input pulse following parallel paths, together and a beam homogenizer for homogenizing the pulse replicas into a homogenized, temporally broadened pulse following a single path.

In FIG. 8 a pulse extender similar to the pulse extender 58 is depicted in a simplified form with mirrors 64, 66, and 68 omitted and delay loop 60 represented by a spiral path 70 symbolically representing the correspondingly designated multiply reflected path of FIG. 4. Beamsplitter 62 is represented only by reflectivity zones $R_1$, $R_2$, $R_3$, and $R_4$, aligned in a 45° plane in the manner of individual beamsplitters. Input pulse 46 enters delay loop 60 and delivers the sequence of pulse replicas 70A–D of equal energy, as described above, and following individual paths separated by a beam width as discussed above with reference to FIGS. 5, 6, and 7. The pulses are separated by a time period τ equal to the width of input pulse 46 and the individual replica pulses 70A–D. The replica pulses are contiguous in time, that is, the trailing edge of one replica pulse is about contemporary with the trailing edge of the other.

The replica pulses are delivered to a beam homogenizer 75. The beam homogenizer may be of any type known in the art suitable for use at the wavelength of the pulse replicas. By way of example, the beam homogenizer may be a light-pipe, preferably having a non-orthogonal cross-section (a kaleidoscope), a lenslet or microlens array, a diffuser plate, or one or more diffractive optical elements. The beam homogenizer provides that the replicas 70A–D are spatially overlapped along a common path to provide a homogenized extended pulse 77 formed from the temporally continuous sequence 70A–D of equal-energy replica pulses.

When the delay between replica pulses is equal to the duration of the input optical pulse 46, and correspondingly the duration of replica pulses, the duration of an extended pulse will be about equal to the duration of the input pulse times the number of replica pulses. This is discussed further in further detail hereinbelow with reference to extending the duration an optical pulse having a Gaussian temporal shape.

Figure 9:
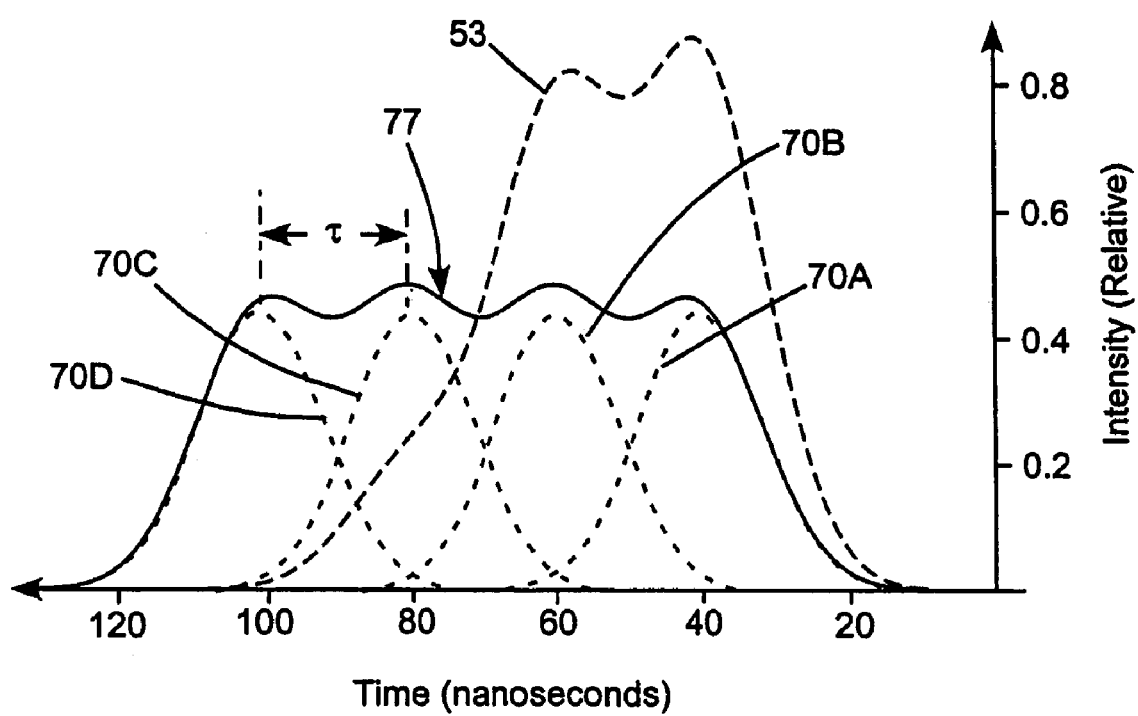
FIG. 9 is a graph schematically illustrating calculated summing of pulse replicas having a Gaussian temporal shape in the pulse extender arrangement of FIG. 8 with the summation of FIG. 3 depicted by way of comparison.

Pulse replicas 70A–D are depicted in FIG. 8 as having a rectangular temporal shape for convenience of illustration at the scale of the drawing. In practice these replicas have a temporal shape closer to a Gaussian shape, as discussed above with reference to FIG. 3. FIG. 9 schematically depicts pulse replicas 70A–D (dotted curves), represented as Gaussian shaped pulses having a temporal width of about 20 ns measured at 50% of peak intensity. The pulse replicas have a duration of about 20 ns, are temporally spaced or delayed, one from the next, by the temporal pulse duration (τ) of 20 ns and have equal energy. The configuration of beamsplitter 62 is assumed to be that of FIG. 5. Optical losses of 20% per round trip are assumed. Reflectivity values for $R_1$, $R_2$, $R_3$, and $R_4$ are assumed to be 17.5%, 74.0%, 56.0%, and 0.0%, respectively. The calculated sum of the replica pulses (extended pulse 77) is depicted in FIG. 9 by a solid curve. Here, each replica pulse contributes about equally to the width of the extended pulse. The replica pulses overlap at 50% peak intensity. The temporal position of the 50% peak intensity points of any replica pulse provides a convenient definition of the temporal position of the leading and trailing edges of that pulse replica. Extended pulse 77, here, has a duration four (the number or replica pulses) times the duration of input pulse 46. Prior-art extended pulse 53 of FIG. 3 having about the same energy as pulse 77, but having a duration only about 2.5 times that of pulse 46, is depicted by a dashed curve (53) for purposes of comparison.

Figure 10:
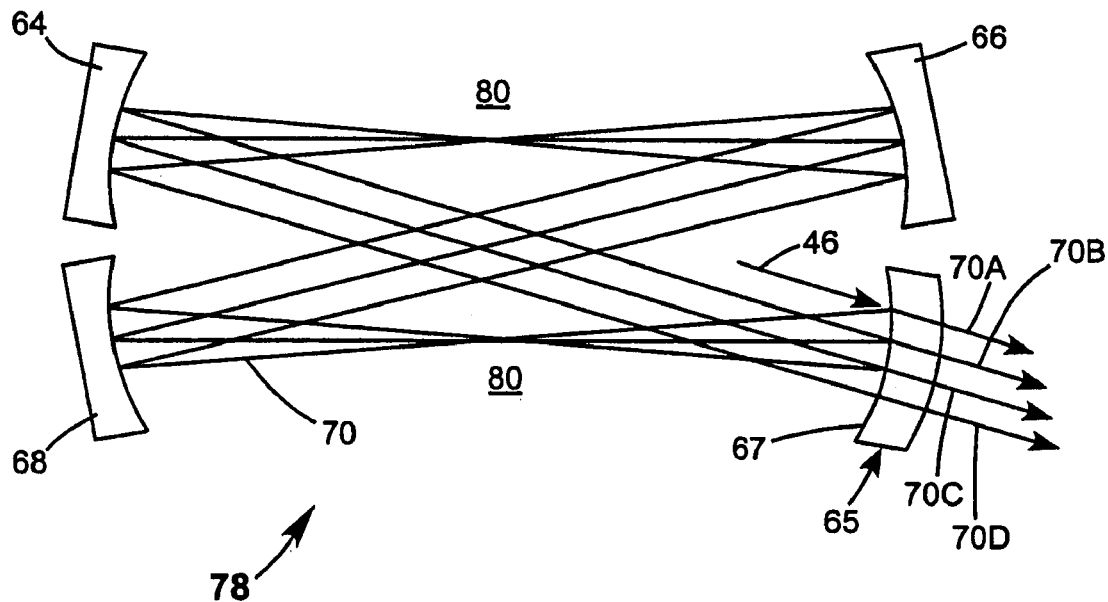
FIG. 10 is a plan view schematically illustrating another preferred embodiment of a pulse extender in accordance with the present invention similar to the pulse extender of FIG. 4, but wherein the graded reflectivity beamsplitter has a spherical concave surface on which the reflective zones are defined.

FIG. 10 schematically illustrates a second preferred embodiment 78 of a pulse extender in accordance with the present invention including a delay loop 80. Pulse extender 78 is similar to extender 58 of FIG. 4 with an exception that graded reflectivity beamsplitter 62 of pulse extender 58 is replaced by a graded reflectivity beamsplitter 65 in the form of a meniscus lens having zero dioptric power. Graded reflectivity zones are formed on concave surface 67 of the beamsplitter. Surface 67, considered as a mirror, has the same focal length f as mirrors 64, 66, and 68. Opposing mirrors are spaced by a distance of about 2f such that 1:1 relay imaging conditions are satisfied. Providing that graded reflectivity beamsplitter 65 is a meniscus lens of zero power avoids the beamsplitter changing the divergence of transmitted replica pulses. It should be noted here that the sequence of graded reflectivity zones $R_1$, $R_2$, $R_3$, and $R_4$ (not shown), of beamsplitter 65 must be arranged in the opposite sense to those of beamsplitter 62 depicted in FIG. 5.

Figure 11:
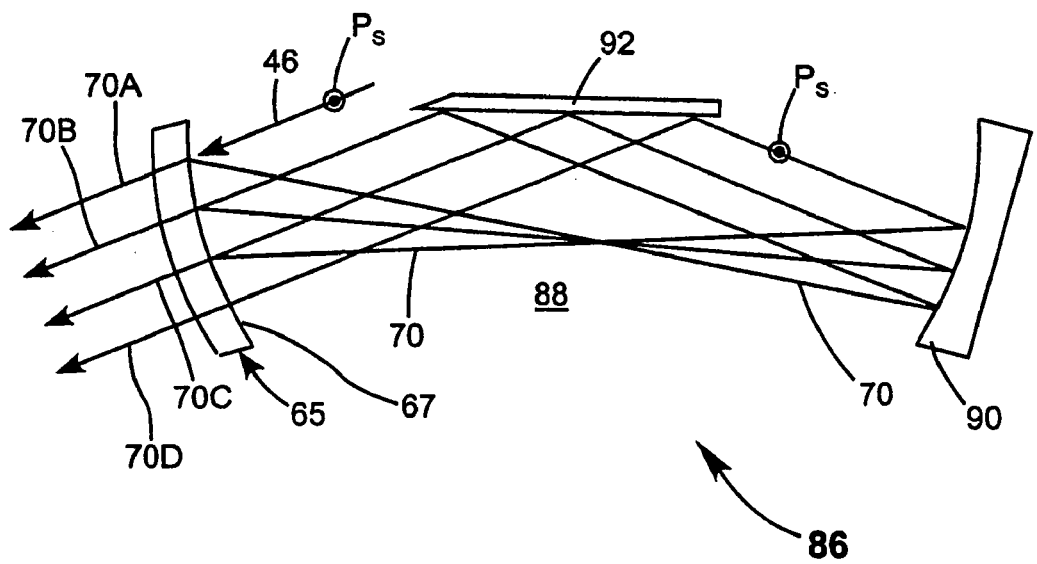
FIG. 11 is a plan view schematically illustrating yet another preferred embodiment of a pulse extender in accordance with the present invention including an optical delay loop formed by a concave spherical graded reflectivity beamsplitter, a plane mirror and a concave spherical mirror.

Referring next to FIG. 11, a third preferred embodiment 86 in accordance with the present invention includes a delay loop 88 formed from a spherical graded reflectivity beamsplitter 65 in the form of a zero power meniscus and having graded reflectivity zones $R_1$, $R_2$, $R_3$, and $R_4$ (not shown) on spherical concave surface 67 thereof, a concave spherical mirror 90, and a plane mirror 92. Surface 67 of graded reflectivity beamsplitter 65 and mirror 90 are arranged confocally. Plane mirror $M_3$ is aligned to cause a circulating beam 70 to make round trips such that the beam is progressively displaced laterally on the beamsplitter surface 67 by the width of the beam, as in other above-described embodiments. Four replica pulses 70A–D are temporally spaced apart by the round trip time of beam 70 in delay loop 88. The zero-power meniscus form of graded reflectivity beamsplitter 65 provides that the divergence of the replica pulses is unchanged. Again, it is preferable that provide a one to one relay image on surface 67 of beamsplitter 65 on each round trip. Input beam (pulse) 46 is depicted in FIG. 11 as bypassing mirror 92. It is possible, however, to make mirror 92 longer, and transmissive in the area where the incoming beam passes through the mirror, with the remaining area of the mirror being highly reflective.

An advantage of pulse extender 86 is in a reduced number of folding mirrors compared with above described ones of the inventive pulse extenders. Since each mirror introduces several percent of optical loss, the smaller number mirrors and the consequently smaller number of reflections per round trip provide for a significant increase of energy efficiency. Further, if incoming beam 46 is polarized perpendicular to the plane of drawing, as depicted by arrowhead $P_S$, mirror 92 sees s-polarized radiation. This allows mirror coatings to have a higher reflectivity for a given number of layers than would be the case for p-polarized radiation or unpolarized radiation. This provides for lower optical loss per round trip.

Figure 1:
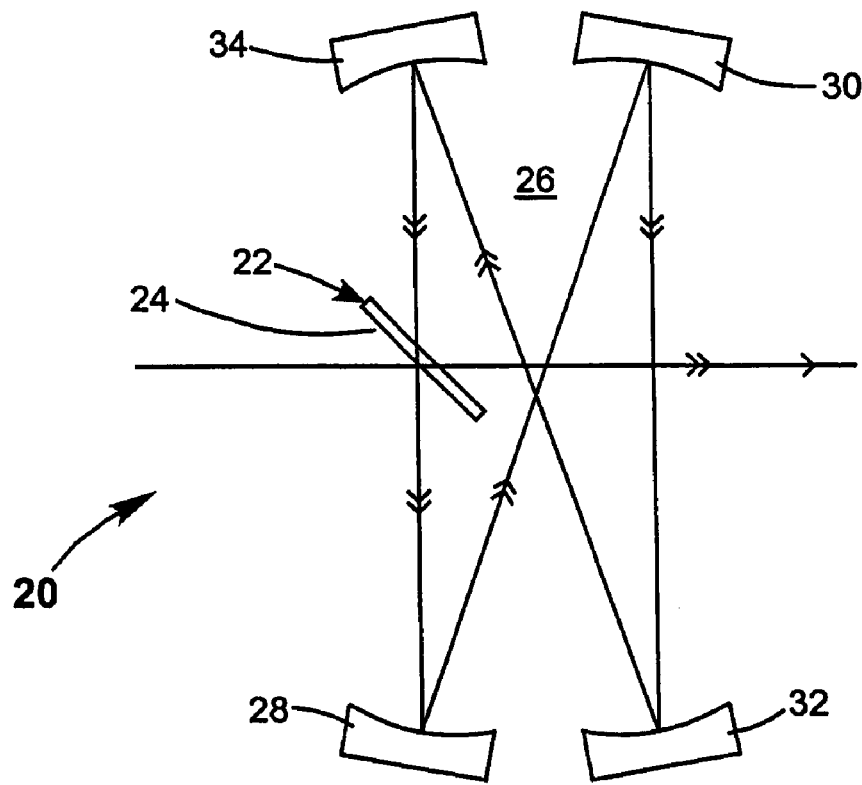
FIG. 1 schematically illustrates a prior art-pulse extender comprising a beamsplitter and four spherical mirrors arranged to form an optical delay loop.
Figure 2:
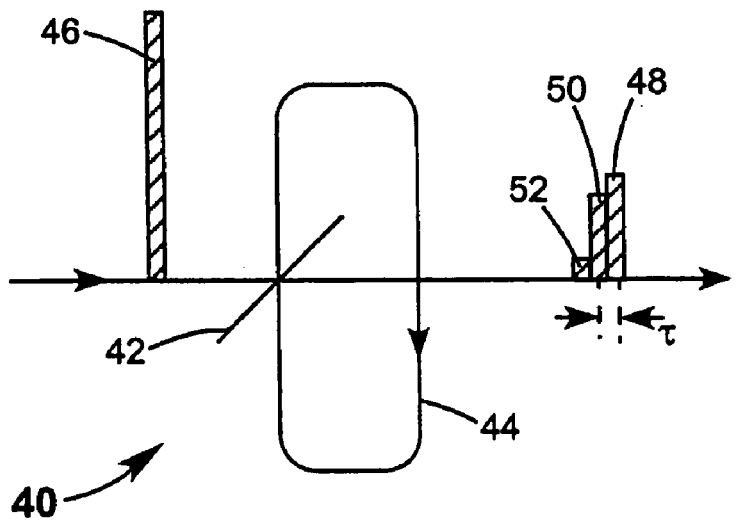
FIG. 2 schematically illustrates a generalized version of a prior-art pulse extender of the type illustrated in FIG. 1, together with a schematic representation of the magnitude of an input pulse and progressively delayed replicas thereof.

By way of example in a pulse extender 86 configured to provide five replica pulses from four round trips of beam 70 in delay loop 88, with beamsplitter 65 having five reflectivity zones $R_1$, $R_2$, $R_3$, $R_4$, and $R_5$, and with beam 70 being s-polarized with respect to the mirrors, calculations indicate that a stretching ratio of about 5.0 is possible with an energy efficiency about of 76%. The calculations assume losses per round trip of about 12% and reflectivity values for $R_1$, $R_2$, $R_3$, $R_4$, and $R_5$ of 85%, 80%, 71.5%, 55%, and 0%, respectively. This is a stretching ratio twice that estimated for the prior-art example of FIG. 1, for a similar efficiency.

Figure 12:
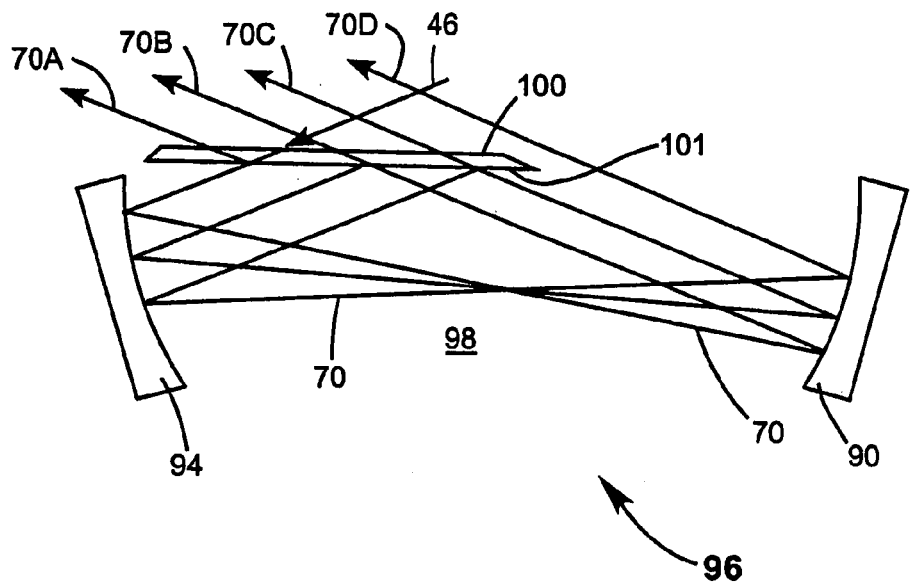
FIG. 12 is a plan view schematically illustrating a further preferred embodiment of a pulse extender in accordance with the present invention including an optical delay loop formed by a plane graded reflectivity beamsplitter and two concave spherical mirrors.

A fourth embodiment 96 of a pulse extender in accordance with the present invention is schematically depicted in FIG. 12. Pulse extender 96 includes a three-reflector delay loop 98, similar to delay loop 88 but with an exception that the concave spherical graded reflectivity beamsplitter 65 of thereof is replaced in pulse extender 96 by a concave mirror 94. Mirrors 90 and 94 are arranged confocally. A plane graded reflectivity beamsplitter 100 provides the third mirror of delay loop 98. Reflective zones $R_1$, $R_2$, and $R_3$ (not shown) are formed on surface 101 of graded reflectivity beamsplitter. These are arranged in a similar manner to corresponding zones depicted in FIG. 7 but in an opposite sense. An input beam 46 produces a beam 70 that makes three round trips in delay loop 98 and the output of the pulse extender comprises four pulse replicas 70A–D as described above for other embodiments of the inventive pulse extender.

In pulse extender 96, as depicted in FIG. 12, the last output replica pulse 70D bypasses graded reflectivity beamsplitter 100 and the first replica pulse 70A is formed by a reflection of the input beam from the (not shown) $R_1$ zone of surface 101. Those skilled in the art will recognize from the discussion presented above with respect to the graded reflectivity beamsplitter configurations of FIGS. 5, 6, and 7, however, that beamsplitter 100 could be extended such that last replica pulse 70D passes therethrough (at a zero reflection zone). Beamsplitter 100 can also be configured such that input beam 46 can bypass the graded reflectivity beamsplitter, whereby first replica 70A is formed after beam 70 makes a round trip pass through delay loop 80. Advantages and disadvantages of these beamsplitter configurations apply as discussed above with respect to the graded reflectivity beamsplitter configurations of FIGS. 5, 6, and 7.

It is important to note that all the above-described embodiments of the inventive pulse extender preferably perform one-to-one relay imaging on each complete round trip of the delay loop. Accordingly, the inventive pulse extender is relatively insensitive to misalignment, provided that mirrors thereof are assembled in stable positions with respect to each other. If the entire extender is assembled as a single unit, that unit can be rotated and shifted with respect to the incoming beam without relative misalignment of the output beams or replicas. However, the extender as a whole acts similarly to a plane mirror, with a result that the direction of the replicas will rotate at the twice the angle of rotation of the extender box. Further, in all of the above-described embodiments the replica pulses are delivered along parallel optical paths. This is convenient when further optical operations are to be performed on the pulse replicas.

Figure 13:
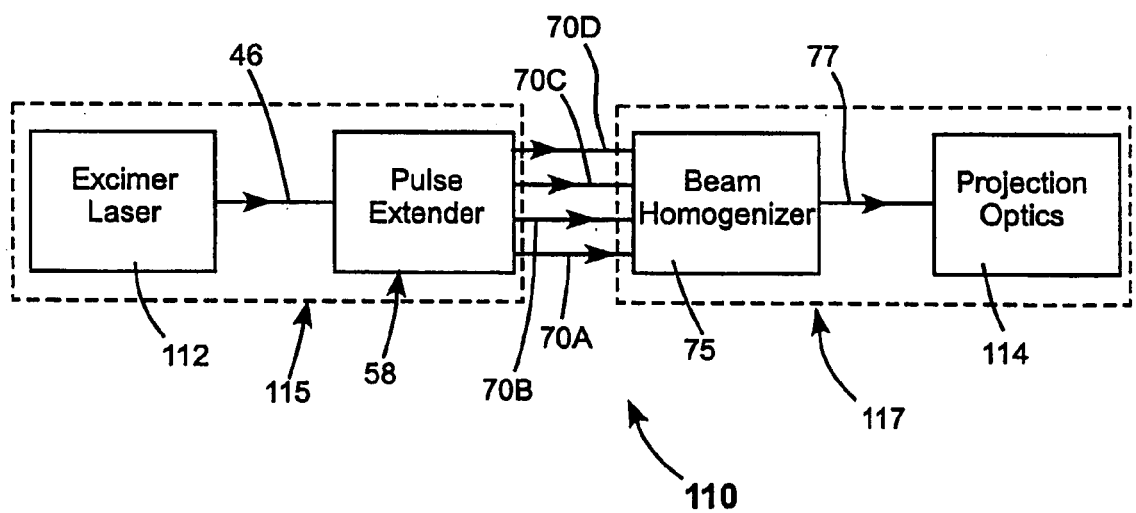
FIG. 13 is a block diagram schematically illustrating an arrangement for temporally broadening a pulse delivered by an excimer laser in a pulse extender in accordance with the present invention, spatially homogenizing the temporally broadened pulse, and delivering the spatially homogenized temporally broadened pulse to optical lithography apparatus.

FIG. 13 schematically illustrates, in block diagram form, a preferred arrangement 110 for using the inventive pulse extender in conjunction with an excimer laser 112 and projection optics 114, for example, projection optics of optical lithography apparatus such as a step and repeat projector (stepper) or the like. The arrangement, however, is applicable to any other pulsed laser providing pulses having comparable parameters and to any other optical apparatus. Excimer laser 112, here, provides an input pulse (beam) 46 that is to be broadened by an optical pulse extender in accordance with the present invention. In the arrangement of FIG. 13, the pulse extender is designated as being embodiment 58 of FIG. 3 but could be any other embodiment of the inventive pulse extender. The excimer laser and the extender would usually be assembled as a system as indicated by dashed rectangle 115. The output of the pulse extender, as discussed above, comprises temporally and spatially separated replica pulses 70A, 70B, 70C, and 70D. The replica pulses are coupled into an optical beam homogenizer 75 that homogenizes the replicas into homogenized extended pulse 77, as discussed above with reference to FIG. 8. The beam homogenizer would usually be incorporated in optical lithography apparatus including the projection optics, as indicated by dashed rectangle 117. The beam homogenizer provides that all points of optical elements in the lithography apparatus see an extended pulse. This contributes to reducing the degradation rate of the lens element material.

In summary, the present invention is described above in terms of a preferred and other embodiments. The invention is not limited, however, to the embodiments described and depicted herein. Rather, the invention is limited only by the claims appended hereto.

What is claimed is:

1. An apparatus for extending the length of a laser pulse comprising:
   at least two mirrors; and
   a composite beam splitter, said beam splitter having at least three zones with different levels of partial reflectivity, said mirrors and beam splitter being positioned so that a successively diminishing portion of the pulse will circulate between the mirrors and the beam splitter and impinge on a different zone of said beam splitter on each pass to create a plurality of partial pulses the sum of which corresponds to a lower energy, longer pulse.

2. An apparatus as recited in claim 1, wherein said zones are oriented in a linear array and the partial pulses are spatially separated.

3. An apparatus as recited in claim 2, further including a beam homogenizer positioned to spatially combine the partial pulses.

4. An apparatus as recited in claim 1, wherein the reflectivities of said beam splitter zones are selected so that each of the partial pulses has about the same energy.

5. A method of extending the length of a laser pulse comprising the steps of:
  forming a beam splitter having at least three zones with different levels of partial reflectivity; and
  sequentially impinging a successively diminishing portion of the pulse on each of said three zones in order to create a plurality of partial pulses the sum of which corresponds to a lower energy, longer pulse.

6. A method as recited in claim 5, wherein said partial pulses are spatially separated and further including the step of spatially combining the partial pulses.

7. Apparatus for extending the duration of an optical pulse, comprising:
  a delay loop formed by two or more mirrors and a beamsplitter and configured to receive the optical pulse;
  said beamsplitter including at least three zones, each zone having a different level of partial reflectivity;
  said mirrors and said beamsplitter being configured and aligned such that a successively diminishing portion of the optical pulse makes a predetermined number of round trips in the delay loop, the optical pulse being incident on different ones of said beamsplitter zones during successive round trips; and
  wherein the reflectivities of said beamsplitter zones are selected such that the pulse extender delivers, via said beamsplitter zones, a sequence of partial pulses the sum of which corresponds to a lower energy, longer pulse.

8. An apparatus as recited in claim 7, wherein said zones are oriented in a linear array and the partial pulses are spatially separated.

9. An apparatus as recited in claim 8, further including a beam homogenizer positioned to spatially combine the partial pulses.

10. An apparatus as recited in claim 7, wherein the reflectivities of said beam splitter zones are selected so that each of the partial pulses has about the same energy.

11. Apparatus for extending the duration of an optical pulse, comprising:
  a delay loop formed by two or more mirrors and a plurality of beamsplitters, each of said beamsplitters having a different level of partial reflectivity, said delay loop being configured to receive the optical pulse;
  said mirrors and said beamsplitters being configured and aligned such that a successively diminishing portion of the optical pulse makes a predetermined number of round trips in the delay loop, the optical pulse being incident on different ones of said beamsplitters during successive round trips; and
  wherein the reflectivities of said beamsplitters are selected such that the pulse extender delivers, via said beamsplitters, a sequence of partial pulses the sum of which corresponds to a lower energy, longer pulse.

12. An apparatus as recited in claim 11, wherein said beamsplitters are oriented in a linear array and the partial pulses are spatially separated.

13. An apparatus as recited in claim 12, further including a beam homogenizer positioned to spatially combine the partial pulses.

14. An apparatus as recited in claim 11, wherein the reflectivities of said beam splitters are selected so that each of the partial pulses has about the same energy.

* * * * *